(12) United States Patent
Handa et al.

(10) Patent No.: US 9,239,975 B2
(45) Date of Patent: Jan. 19, 2016

(54) IMAGE FORMING APPARATUS PERFORMING A DELAY PROCESS WHEN A NUMBER OF SHEETS PRINTED IN A UNIT OF TIME IS EQUAL TO OR GREATER THAN A REFERENCE NUMBER

(71) Applicant: BROTHER KOGYO KABUSHIKI KAISHA, Nagoya-shi, Aichi-ken (JP)

(72) Inventors: Hiroshi Handa, Inazawa (JP); Masahito Saeki, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/668,025

(22) Filed: Mar. 25, 2015

(65) Prior Publication Data

US 2015/0278657 A1  Oct. 1, 2015

(30) Foreign Application Priority Data

Mar. 31, 2014  (JP) .................................. 2014-074513

(51) Int. Cl.
| | | |
|---|---|---|
| H04N 1/40 | (2006.01) | |
| G06K 15/02 | (2006.01) | |
| G06F 3/12 | (2006.01) | |
| G06K 15/00 | (2006.01) | |
| H04N 1/00 | (2006.01) | |

(52) U.S. Cl.
CPC .......... *G06K 15/1809* (2013.01); *G06F 3/1208* (2013.01); *G06F 3/1253* (2013.01); *G06K 15/1872* (2013.01); *G06K 15/407* (2013.01); *H04N 1/00915* (2013.01)

(58) Field of Classification Search
None
See application file for complete search history.

(56) References Cited

U.S. PATENT DOCUMENTS

| | | | | |
|---|---|---|---|---|
| 6,035,151 A * | 3/2000 | Ono | .................... | G03G 15/1675 399/43 |
| 8,005,377 B2 * | 8/2011 | Yamazaki | ............ | G03G 15/065 399/44 |
| 8,396,383 B2 * | 3/2013 | Honjoh | ................ | G03G 15/757 399/44 |

FOREIGN PATENT DOCUMENTS

| | | |
|---|---|---|
| JP | 2003-173074 A | 6/2003 |
| JP | 2005-292475 A | 10/2005 |

* cited by examiner

*Primary Examiner* — Steven Kau
(74) *Attorney, Agent, or Firm* — Merchant & Gould PC

(57) ABSTRACT

Image forming apparatus includes: image forming unit for forming an image on a sheet, and controller for controlling the image forming unit. The controller includes process modules to carry out: counting process for performing counting in accordance with the number of sheets printed by the image forming unit; first bias applying process for setting a developing bias to be applied to the developer carrier to a first bias if a count value in the counting process has not reached a predetermined threshold value; bias changing process for changing the developing bias to a second bias whose absolute value is smaller than that of the first bias if the count value has reached the threshold value; and delaying process for causing an execution timing of the bias changing process to be delayed if the number of sheets printed in a unit of time is not smaller than a reference number.

18 Claims, 11 Drawing Sheets

FIG.8

| | DECREMENT OF COUNT VALUE | COUNT VALUE |
|---|---|---|
| 1ST SHEET | ○ | 150→149 |
| 2ND SHEET | ○ | 149→148 |
| 3RD SHEET | ○ | 148→147 |
| 4TH SHEET | ○ | 147→146 |
| 5TH SHEET | ○ | 146→145 |
| 6TH SHEET | ○ | 145→144 |
| 7TH SHEET | ○ | 144→143 |
| 8TH SHEET | ○ | 143→142 |
| 9TH SHEET | ○ | 142→141 |
| 10TH SHEET | ○ | 141→140 |
| 11TH SHEET | × | 140 |
| 12TH SHEET | × | 140 |
| 13TH SHEET | × | 140 |
| 14TH SHEET | × | 140 |
| 15TH SHEET | × | 140 |
| 16TH SHEET | × | 140 |
| 17TH SHEET | × | 140 |
| 18TH SHEET | × | 140 |
| 19TH SHEET | × | 140 |
| 20TH SHEET | × | 140 |
| 21ST SHEET | ○ | 140→139 |
| 22ND SHEET | ○ | 139→138 |
| 23RD SHEET | ○ | 138→137 |
| 24TH SHEET | ○ | 137→136 |
| 25TH SHEET | ○ | 136→135 |
| 26TH SHEET | ○ | 135→134 |
| 27TH SHEET | ○ | 134→133 |
| 28TH SHEET | ○ | 133→132 |
| 29TH SHEET | ○ | 132→131 |
| 30TH SHEET | ○ | 131→130 |
| 31ST SHEET | × | 130 |
| 32ND SHEET | × | 130 |
| 33RD SHEET | × | 130 |
| 34TH SHEET | × | 130 |
| 35TH SHEET | × | 130 |
| 36TH SHEET | × | 130 |
| 37TH SHEET | × | 130 |
| 38TH SHEET | × | 130 |
| 39TH SHEET | × | 130 |
| 40TH SHEET | × | 130 |

FIRST 1 MINUTE: sheets 1–20
NEXT 1 MINUTE: sheets 21–40

IMAGE FORMING APPARATUS PERFORMING A DELAY PROCESS WHEN A NUMBER OF SHEETS PRINTED IN A UNIT OF TIME IS EQUAL TO OR GREATER THAN A REFERENCE NUMBER

CROSS REFERENCE TO RELATED APPLICATIONS

The present application claims priority from Japanese Patent Application No. 2014-074513 filed on Mar. 31, 2014, the disclosure of which is incorporated herein by reference in its entirety.

TECHNICAL FIELD

An aspect of this disclosure relates to an image forming apparatus.

BACKGROUND ART

In an electrophotographic image forming apparatus, when the total number of printed sheets (i.e., total number of sheets printed with one toner cartridge) becomes large, the charge amount of developer decreases greatly due to degradation of the developer. As a result, the density of the developer increases. In order to suppress the increase in the density of the developer, a known technique suggests that the developing bias is lowered when the total number of sheets printed by the image forming apparatus is equal to or greater than a predetermined value. To be more specific, for example, the total number of printed sheets is counted as developer consumption, and the developing bias is lowered when the developer consumption is equal to or greater than a predetermined value.

SUMMARY

However, in the above-described technique, the number of printed sheets and the temperature in the main body casing of the image forming apparatus (hereinafter referred to as an "internal temperature") are not considered to have a correlation, with the result that if the density of developer increases due to increase in the internal temperature, the image quality of the printed sheet may be degraded. Further, it would be conceivable that the developing bias is lowered based on the estimation that the internal temperature is elevated when the number of printed sheets is equal to or greater than a predetermined value. However, because the relationship between the internal temperature and the number of printed sheets is not a simple proportional relationship, there may be a possibility that the internal temperature is not actually elevated even when the number of printed sheets is equal to or greater than the predetermined value.

In view of the above, it is desirable to restrain the density of developer from being increased when the internal temperature is elevated, so as to suppress degradation of the image quality.

According to one aspect, there is provided an image forming apparatus comprising: an image forming unit configured to form an image on a sheet; and a controller configured to control the image forming unit. The image forming unit includes a photoconductor, and a developer carrier configured to carry developer to be supplied to an electrostatic latent image formed on the photoconductor.

The controller includes process modules to carry out: a counting process for performing counting in accordance with the number of sheets printed by the image forming unit; a first bias applying process for setting a developing bias to be applied to the developer carrier to a first bias if a count value in the counting process has not reached a predetermined threshold value; a bias changing process for changing the developing bias to a second bias whose absolute value is smaller than that of the first bias if the count value has reached the threshold value; and a delaying process for causing an execution timing of the bias changing process to be delayed if the number of sheets printed in a unit of time is equal to or greater than a reference number, with respect to an execution timing determined if the number of sheets printed in the unit of time is smaller than the reference number.

Herein, "the number of sheets printed by the image forming unit" can be obtained, for example, by calculation based on a value derived from a sheet sensor for detecting passage of a sheet, or by estimation based on the number of operations of a pickup roller.

According to another aspect, there is provided an image forming apparatus comprising: an image forming unit configured to form an image on a sheet; and a controller configured to control the image forming unit. The image forming unit includes a photoconductor, and a developer carrier configured to carry developer to be supplied to an electrostatic latent image formed on the photoconductor.

The controller comprises: a counting process executing module configured to perform counting in accordance with the number of sheets printed by the image forming unit; a first bias applying process executing module configured to set a developing bias to be applied to the developer carrier to a first bias if a count value counted by the counting process executing module has not reached a predetermined threshold value; a bias changing process executing module configured to change the developing bias to a second bias whose absolute value is smaller than that of the first bias if the count value has reached the threshold value; and a delaying process executing module configured to cause an execution timing for changing the developing bias to the second bias to be delayed if the number of sheets printed in a unit of time is equal to or greater than a reference number, with respect to an execution timing determined if the number of sheets printed in the unit of time is smaller than the reference number.

These and other objects and aspects will become apparent from the following description taken in conjunction with the accompanying drawings.

BRIEF DESCRIPTION OF THE DRAWINGS

FIG. 8 is a diagram explaining one example of a counting process and a delaying process.

DETAILED DESCRIPTION

A detailed description will be given of an illustrative configuration of an image forming apparatus with reference to the accompanying drawings.

Figure 1:
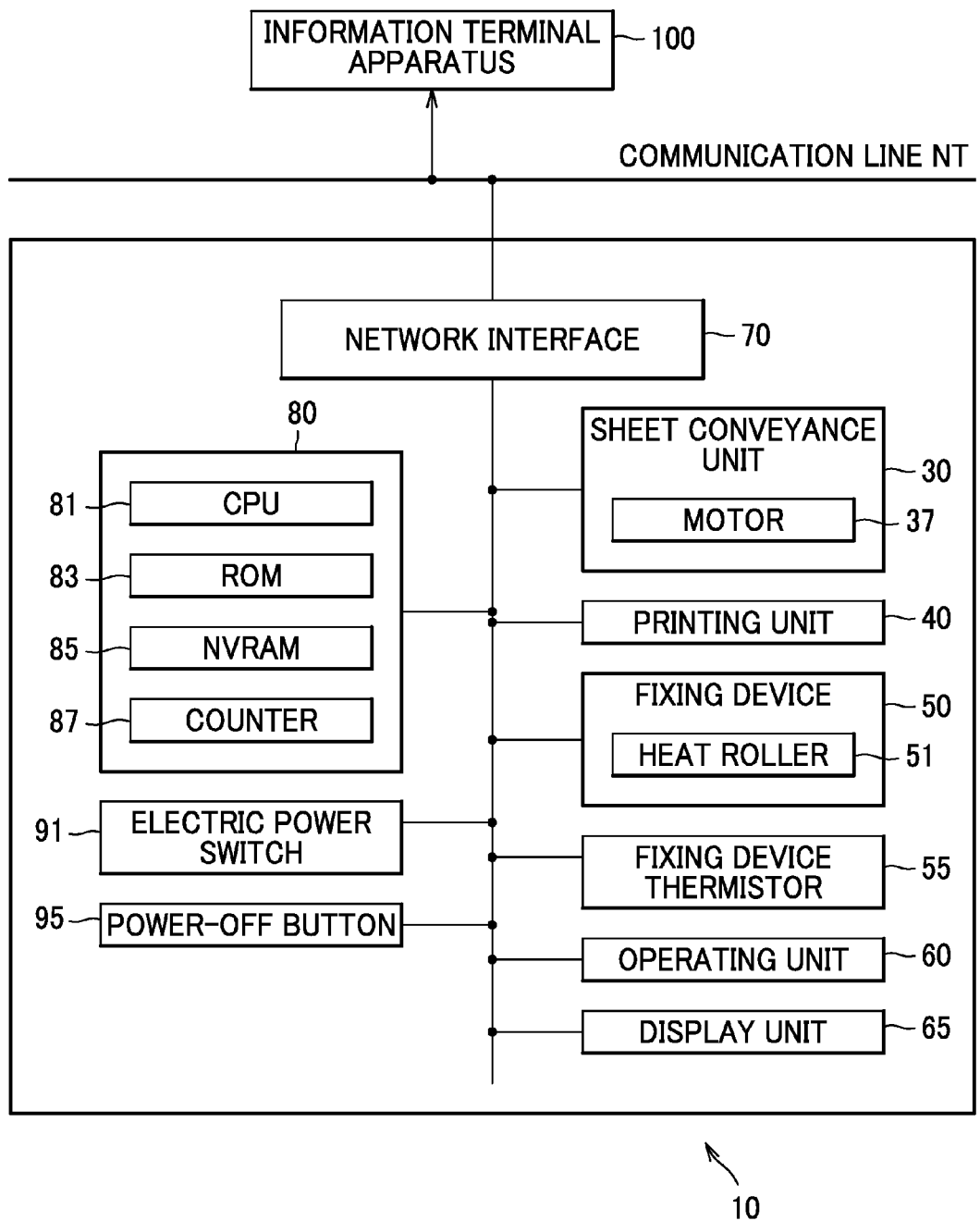
FIG. 1 is a block diagram schematically showing an electrical configuration of a printer according to an illustrative disclosure.
Figure 2:
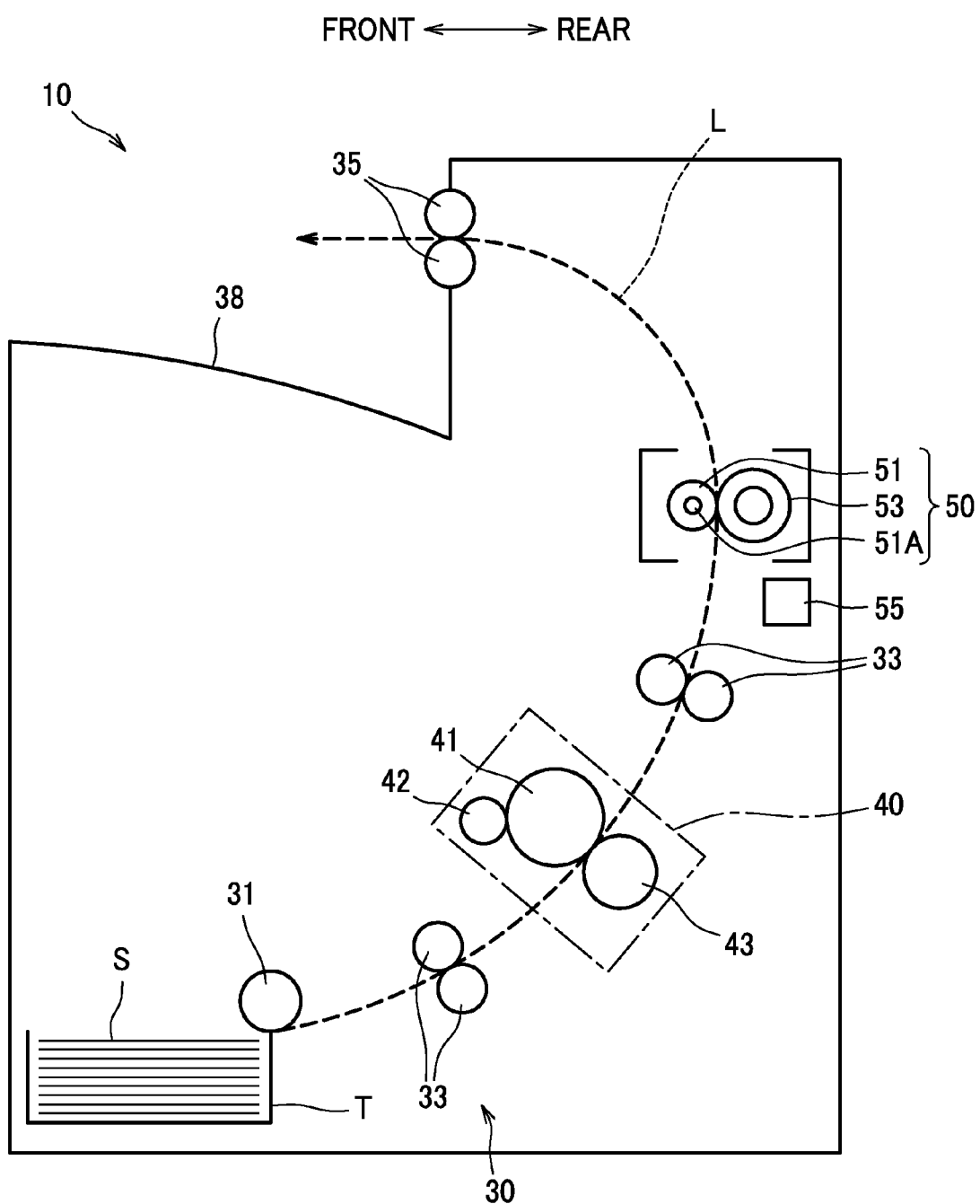
FIG. 2 is a side section showing main parts of the printer.
Figure 3:
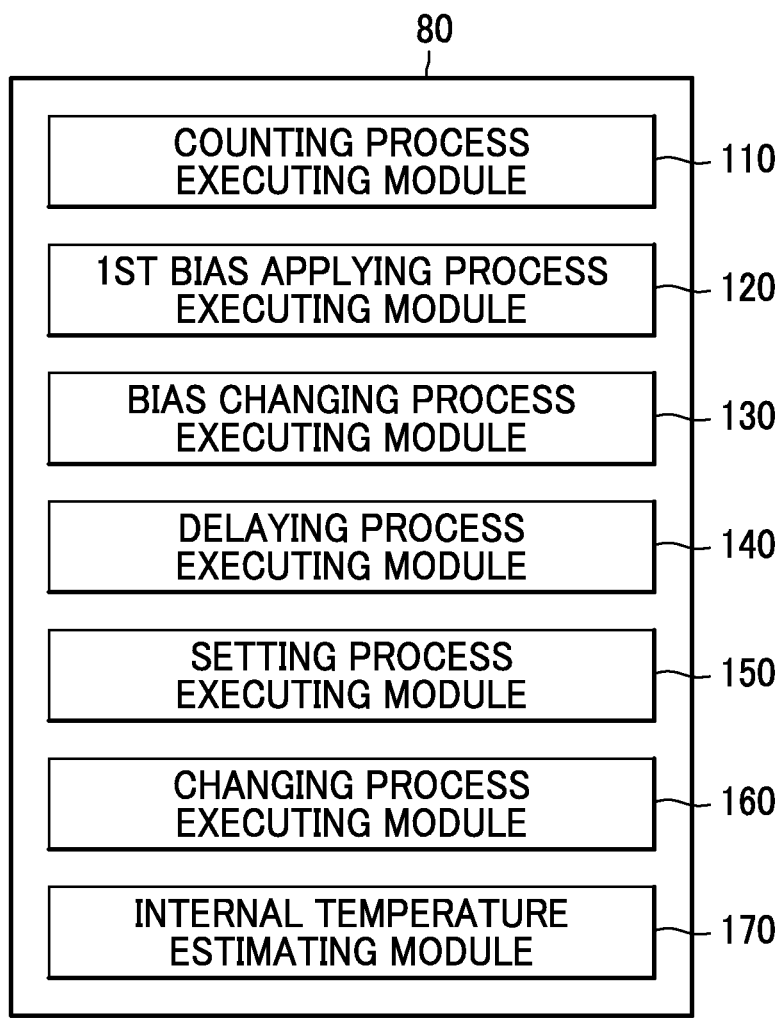
FIG. 3 is a block diagram schematically showing process modules in a controller.

With reference to FIGS. 1 to 3, the configuration of a printer 10 as an example of the image forming apparatus will be described.

The printer 10 mainly includes a sheet conveyance unit 30, a printing unit 40, a fixing device 50, a fixing device thermistor 55, an operating unit 60, a display unit 65, a network interface 70, a controller 80, an electric power switch 91, and a power-off button 95. The printing unit 40 and the fixing device 50 are an example of an image forming unit.

The sheet conveyance unit 30 is configured to pick up a sheet S on one-by-one basis from a stack of sheets (recording media) stored in a tray T that is located in a lower part of the printer 10 and to convey the sheet S along a sheet conveyance path L. The sheet conveyance unit 30 includes a various rollers such as a sheet feed roller 31, a conveyance roller 33 and a sheet ejection roller 35, and a motor 37 for rotating these rollers. The sheet conveyance unit 30 is controlled by the controller 80 to convey a sheet S at a constant speed.

The printing unit 40 is configured to electrophotographically print an image (toner image) on a sheet S that is carried along the sheet conveyance path L. The printing unit 40 includes a photoconductor drum 41 as an example of a photoconductor, a charger (not shown), a developing roller 42 as an example of a developer carrier, a transfer roller 43, and other components.

To be more specific, the surface of the photoconductor drum 41 is charged by the charger, and then exposed to a laser beam emitted from an exposure device (not shown), so that an electrostatic latent image is formed on the photoconductor drum 41. Toner (developer) in a toner hopper (not shown) is supplied to the electrostatic latent image through the developing roller 42, so that the toner image is formed on the photoconductor drum 41. After that, the toner image on the photoconductor drum 41 is transferred onto a sheet S while the sheet S is conveyed along the sheet conveyance path L between the photoconductor drum 41 and the transfer roller 43.

The fixing device 50 is located at a position downstream of the printing unit 40, and includes a heat roller 51, a pressure roller 53, and other components. The heat roller 51 has a built-in heater 51A such as made of a halogen lamp, and generates heat when energized. The fixing device 50 is configured to thermally fix an image (toner image) formed on a sheet S while the sheet S passes through between the heat roller 51 and the pressure roller 53. The sheet S with the toner image thermally fixed thereon is ejected out from the sheet ejection roller 35 onto a sheet output tray 38.

The fixing device thermistor 55 is provided in the proximity of the heat roller 51. The fixing device thermistor 55 is configured to detect temperature of the heat roller 51. The temperature control of the heat roller 51 is performed based on the detected temperature.

The operating unit 60 includes a plurality of buttons for allowing a user to perform various input operations such as a printing command for printing on a sheet S. The display unit 65 includes a liquid crystal display, lamps, and other components. The display unit 65 can display various setting screens and operating conditions. The network interface 70 is connected to an information terminal apparatus 100 such as a personal computer and a facsimile through a communication line NT to enable data communication between the printer 10 and the information terminal apparatus 100. The electric power switch 91 is a switch (power-on button) for turning on the power to the printer 10. The power-off button 95 is a button for turning off the power of the printer 10.

The controller 80 is configured to control the printer 10. The controller 80 includes a CPU (Central Processing Unit) 81, a ROM (Read Only Memory) 83, a NVRAM (Non-Volatile Random Access Memory) 85, and a counter 87. The ROM 83 stores various programs for controlling the printer 10, and the NVRAM 85 stores various data such as a count value of the counter 87 and the like. When a print job is inputted from the information terminal apparatus 100, the CPU 81 of the controller 80 executes a printing process so that an image based on print data is printed on a sheet S.

Further, the controller 80 includes process modules (see FIG. 3), and the controller 80 is configured to carry out: a counting process for the counter 87 performing counting in accordance with the number of sheets S printed by the printing unit 40 (executed by a counting process executing module 110); a first bias applying process for setting a developing bias to be applied to the developing roller 42 to a first bias if a count value in the counting process is smaller than a predetermined threshold value (executed by a first bias applying process executing module 120); a bias changing process for changing the developing bias to a second bias whose absolute value is smaller than that of the first bias if the count value is equal to or greater than the threshold value (executed by a bias changing process executing module 130); and a delaying process for causing an execution timing of the bias changing process to be delayed if the number of sheets printed in a unit of time is equal to or greater than a reference number, with respect to an execution timing determined if the number of sheets printed in the unit of time is smaller than the reference number (executed by a delaying process executing module 140).

Herein, "the number of sheets S printed by the printing unit 40" can be obtained, for example, by calculation based on a value obtained by a sheet sensor for detecting passage of a sheet, or by estimation based on the number of operations of the sheet feed roller 31, namely, based on the number of sheets picked up. Further, "the reference number (per unit of time)" may be any number within the printing capacity of the printer 10. For example, the reference number may be equal to or greater than one-fifth, one-fourth, one-third or one-half of the printing capacity of the printer 10. It is preferable that "the reference number (per unit of time)" is determined by experiments, simulations or the like, where necessary to provide an appropriate number of sheets such that when the number of sheets printed in a unit of time reaches the reference number, the rate of temperature rise of the printer 10 becomes lower than a predetermined value (i.e., the temperature gradient becomes gentler).

In this disclosure, the printing capacity of the printer 10 is 20 ppm (pages per minute) and the reference number per unit of time is set to 10 ppm.

To be more specific, in the counting process, the controller 80 generally causes the counter 87 to count down (decrement) by "1" each time one sheet S is printed. In this disclosure, the counter 87 takes values from "0" to "150." Further, in this disclosure, the count value of the counter 87 is stored in the NVRAM 85, and when the printer 10 is started up next time, the count value is taken over.

In the delaying process, the controller 80 determines whether or not the number of sheets S printed in a unit of time is smaller than the reference number, by determining whether or not the count amount of the counter 87 within the past 1 minute (i.e., from the present to 1 minute ago) is smaller than a reference number. In other words, in the delaying process, the controller 80 determines whether or not the count amount of the counter 87 within the past 1 minute is smaller than the reference number of "10" that corresponds to the above-described reference number (10 ppm).

Further, in the delaying process, the controller 80 executes a process for decreasing the count amount in such a manner that the count amount per sheet in the counting process is set to be smaller if the count amount of the counter 87 within the past 1 minute is equal to or greater than the reference number of "10", with respect to a count amount determined if the count amount of the counter 87 within the past 1 minute is smaller than the reference number of "10." To be more specific, in the delaying process, the controller executes a process for prohibiting the execution of the counting process if the count amount of the counter 87 within the past 1 minute is equal to or greater than the reference number of "10."

Further, the controller 80 includes other process modules (see FIG. 3), and the controller 80 carries out: a setting process for setting the developing bias to a third bias whose absolute value is greater than that of the first bias if the internal temperature is estimated to be smaller than a predetermined temperature (executed by a setting process executing module 150); and a changing process for changing the developing bias from the third bias to the first bias if the internal temperature is estimated to be equal to or greater than the predetermined temperature (executed by a changing process executing module 160).

To be more specific, in the setting process, the controller 80 determines whether or not the internal temperature is lower than the predetermined temperature, based on a temperature detected by the fixing device thermistor 55 and an elapsed time after a print job is completed (executed by an internal temperature estimating module 170). To be more specific, in the setting process, the controller 80 estimates that the internal temperature is lower than the predetermined temperature if one of the following two conditions is satisfied: a first condition in which the temperature of the fixing device 50 detected by the fixing device thermistor 55 is lower than a predetermined temperature threshold; and a second condition in which the elapsed time after the latest print job is completed is equal to or greater than a predetermined time.

It is to be noted that the temperature threshold is a value below which the internal temperature is determined to be sufficiently low. The temperature threshold can be set, for example, to room temperature (e.g., 20° C.) based on experiments, simulations or the like. The predetermined time is a time required for the printer 10 having been heated due to execution of the printing control to cool down, for example, to the room temperature. The predetermined time can be set appropriately based on experiments, simulations or the like. The elapsed time may be measured by a timer (not shown). Further, the timer may be reset whenever the power-off button 95 is depressed to switch off the printer 10.

Further, the controller is configured to carry out the changing process while a print job is not being executed and while a print job is being executed (step S5 to step S10 in FIG. 5 to be described later). To be more specific, while a print job is not being executed and if none of the above-described first and second conditions are satisfied (step S2: Yes in FIG. 5 to be described later), the controller 80 estimates that the internal temperature is equal to or greater than the predetermined temperature. In this instance, if the developing bias is set to the third bias, the controller 80 executes a changing process for changing the developing bias from the third bias to the first bias.

Furthermore, while a print job is being executed, the controller 80 determines whether or not the internal temperature is equal to or higher than the predetermined temperature, by determining whether or not the number of printed sheets S reaches the predetermined number with the developing bias being set to the third bias. To be more specific, the controller 80 changes the developing bias from the third bias to the first bias if a first count value counted by a first counter (not shown) that is different from the counter 87 is equal to or greater than a predetermined number with the developing bias being set to the third bias. The first counter may be configured to operate counting only when the developing bias is set to the third bias and to count up (increment) the first count value by "1" each time one sheet S is printed. When the developing bias is set to a bias other than the third bias, the first count value is reset to an initial value.

Further, the controller 80 is configured to gradually decrease the developing bias (absolute value) from the third bias to the first bias in the changing process, while a print job is being executed. The controller 80 is also configured to gradually decrease the developing bias (absolute value) from the first bias to the second bias in the above-described bias changing process.

Furthermore, as with the conventional technique, the controller 80 is configured to carry out a control to address the concern that when the total number of printed sheets S increases greatly, the charge amount of developer decreases greatly due to degradation of the developer. To be more specific, the controller 80 includes, for example, a second counter (not shown) that is different from the counter 87 and causes the second counter to count the total number of printed sheets S as a second count value. The controller 80 is configured to carry out a control such that the first bias is gradually decreased with an increase in the second count value. The second count value is reset each time the toner cartridge for storing toner is replaced with a new one. The manner of counting the total number of printed sheets S in this control for addressing degradation of toner may be the same as that described previously with the use of the sheet sensor or the sheet feed roller 31. In this control for addressing degradation of toner, the number of dots in an image printed on a sheet S may be counted instead of counting the total number of printed sheets S.

Next, the operation of the controller 80 will be described in detail.

Figure 4:
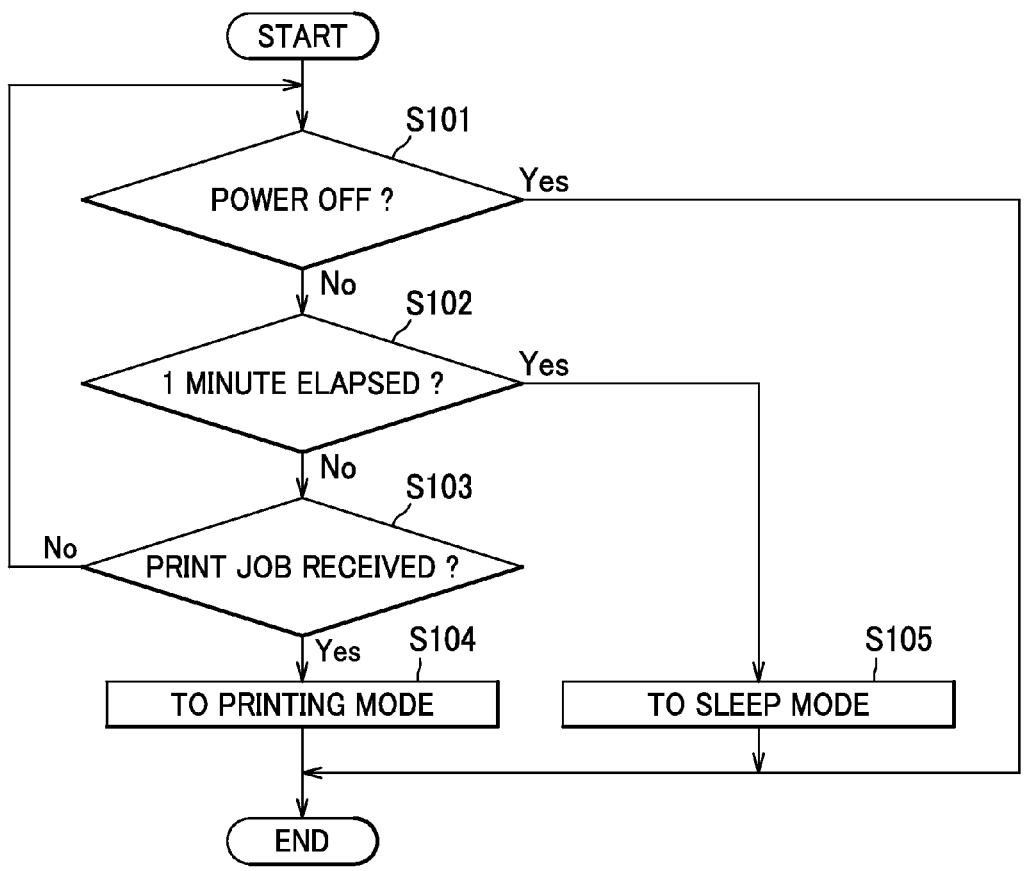
FIG. 4 is a flowchart explaining the operation of the controller while the printer is powered on or after a print job is completed.

While the printer 10 is powered on or after a print job is completed, the controller 80 carries out a control shown in FIG. 4.

In the control shown in FIG. 4, the controller 80 first determines whether or not the power-off button 95 has been depressed (S101). If the controller 80 determines that the power-off button 95 has been depressed (Yes) in step S101, the controller 80 carries out a power-off process for turning off the power of the printer 10 and completes this control. If the controller 80 determines that the power-off button 95 has not been depressed (No), the controller 80 determines whether or not 1 minute has elapsed after switching on the printer 10 or after completing the latest print job (S102).

Figure 7:
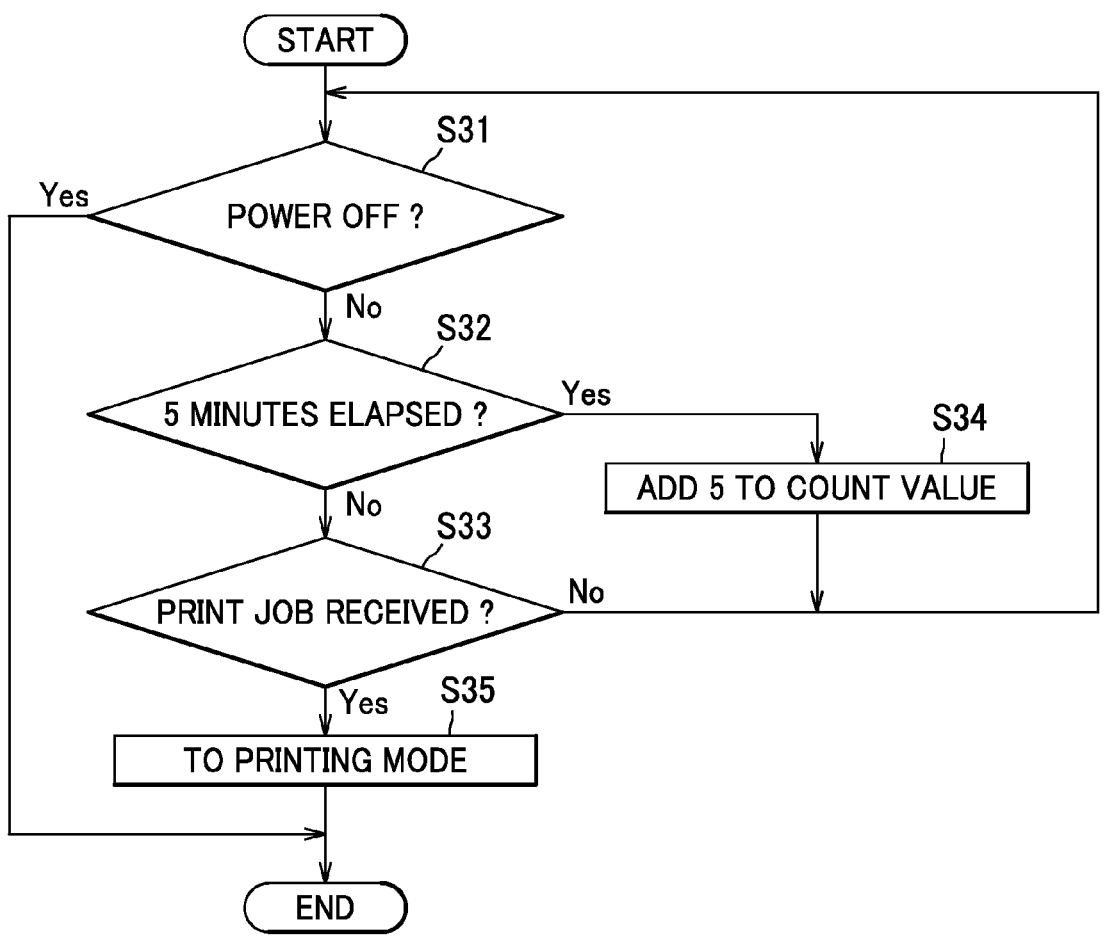
FIG. 7 is a flowchart explaining the operation of the controller in a sleep mode.

If the controller 80 determines that 1 minute has elapsed (Yes) in step S102, the operation proceeds to a sleep mode (S105) in FIG. 7 and the controller 80 completes this control. If the controller 80 determines that 1 minute has not elapsed (No) in step S102, then the controller 80 determines whether or not a print job has been received (S103).

If the controller 80 determines that no print job has been received (No) in step S103, the operation returns to the process of step S101. If the controller 80 determines that a print job has been received (Yes) in step S103, the operation proceeds to a printing mode (S104) shown in FIG. 5 and the controller 80 completes this control.

Figure 5:
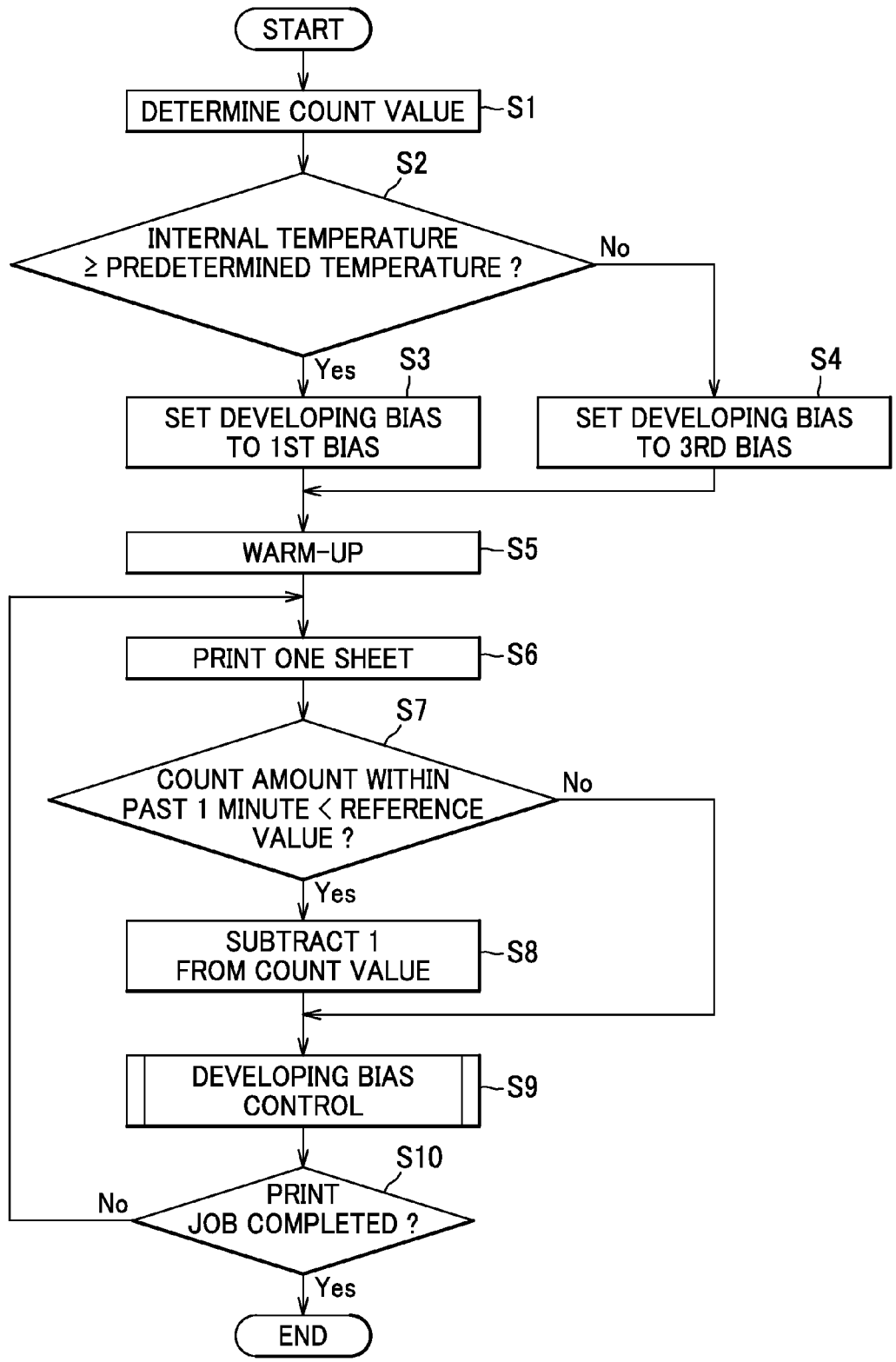
FIG. 5 is a flowchart explaining the operation of the controller in a printing mode.

In the printing mode shown in FIG. 5, the controller 80 reads out the count value of the counter 87 from the NVRAM 85 and determines the current count value (S1). In this disclosure, the initial value of the count value is 150.

After step S1, the controller 80 determines whether or not the internal temperature is equal to or higher than the predetermined temperature (S2). If the controller 80 determines that the internal temperature is equal to or higher than the predetermined temperature (Yes) in step S2, the controller 80 sets the developing bias to the first bias (S3). If the controller 80 determines that the internal temperature is lower than the predetermined temperature (No) in step S2, the controller 80 sets the developing bias to the third bias (S4).

After setting the developing bias in step S3 or step S4, the controller 80 executes a known warm-up operation (S5). To be more specific, the controller 80 executes various processes in step S5 which includes turning on the heater 51A, causing the photoconductor drum 41 to rotate, and agitating toner. After the warm-up operation is completed, the controller 80 causes the sheet conveyance unit 30 to actuate to print one sheet S (S6).

After step S6, the controller 80 determines whether or not the count amount of the counter 87 within the past 1 minute (i.e., from the present to 1 minute ago) is smaller than the reference number of "10" (S7). If the controller 80 determines that the count amount within the past 1 minute is smaller than the reference number of "10" (Yes) in step S7, the controller 80 subtracts "1" from the count value (S8). If the controller 80 determines that the count amount within the past 1 minute is equal to or greater than the reference number of "10" (No) in step S7, the operation proceeds to the next step (S9) and the counter 87 does not operate counting.

To be more specific, for example, as shown in FIG. 8, in the case where the printer 10 has a printing capacity of 20 ppm and 40 sheets S are continuously printed in one print job, each time the first to tenth sheets S are printed, the count value of the counter 87 is decreased by "1" and the count value is changed, for example, from "150" to "140." On the contrary, when the 11th to 20th sheets S are printed, the count value of the counter 87 is not decreased because the count amount of the counter 87 within the past 1 minute is "10."

After that, when printing of the 21st sheet S is started and at the time when the determination is made as to whether or not the subtracted amount of the counter 87 within the past 1 minute is smaller than the reference number of "10", it is assumed that 1 minute has already elapsed since the printing of the 1st sheet is started and the count value of the counter 87 is decreased by "1." Therefore, the count amount of the counter 87 within the past 1 minute is "9." Accordingly, since the count amount of the counter 87 within the past 1 minute is smaller than the reference number of "10", the count value of the counter 87 is decreased by "1" in step S8 and the count value of the counter 87 is changed from "140" to "139."

Similarly, when printing of the 22nd sheet S is started and at the time when the determination is made as to whether or not the count amount of the counter 87 within the past 1 minute is smaller than the reference number of "10", it is assumed that 1 minute has already elapsed since the printing of the 2nd sheet is started and the count value of the counter 87 is decreased by "1." Therefore, the count amount of the counter 87 within the past 1 minute is "9." Accordingly, since the count amount of the counter 87 within the past 1 minute is smaller than the reference number of "10", the count value of the counter 87 is decreased by "1" in step S8 and the count value of the counter 87 is changed from "139" to "138." In this way, as with the printing of the 1st to 10th sheets, when printing of the 21st to 30th sheets S is executed, the count value of the counter 87 is decreased by "1" each time a sheet S is printed. The count value of the counter 87 becomes "130" at the time when printing of the 30th sheet S is executed. After that, as with the printing of the 11th to 20th sheets S, when the 31st to 40th sheets S are printed, the count value of the counter 87 is not decreased and remains unchanged from "130" which number corresponds to the printing of the 30th sheet S.

As described above, in the case where the printer 10 has the printing capacity of 20 ppm and 40 sheets S are continuously printed in one print job, two processes (i.e., the process in which the count value of the counter 87 is decreased by "1" each time one sheet S is printed, and the process in which the count value of the counter 87 is not decreased despite printing of a sheet S) are alternately repeated every 10 sheets. In this case, if 290 sheets are continuously printed, the count value of the counter 87 becomes "0."

Figure 6:
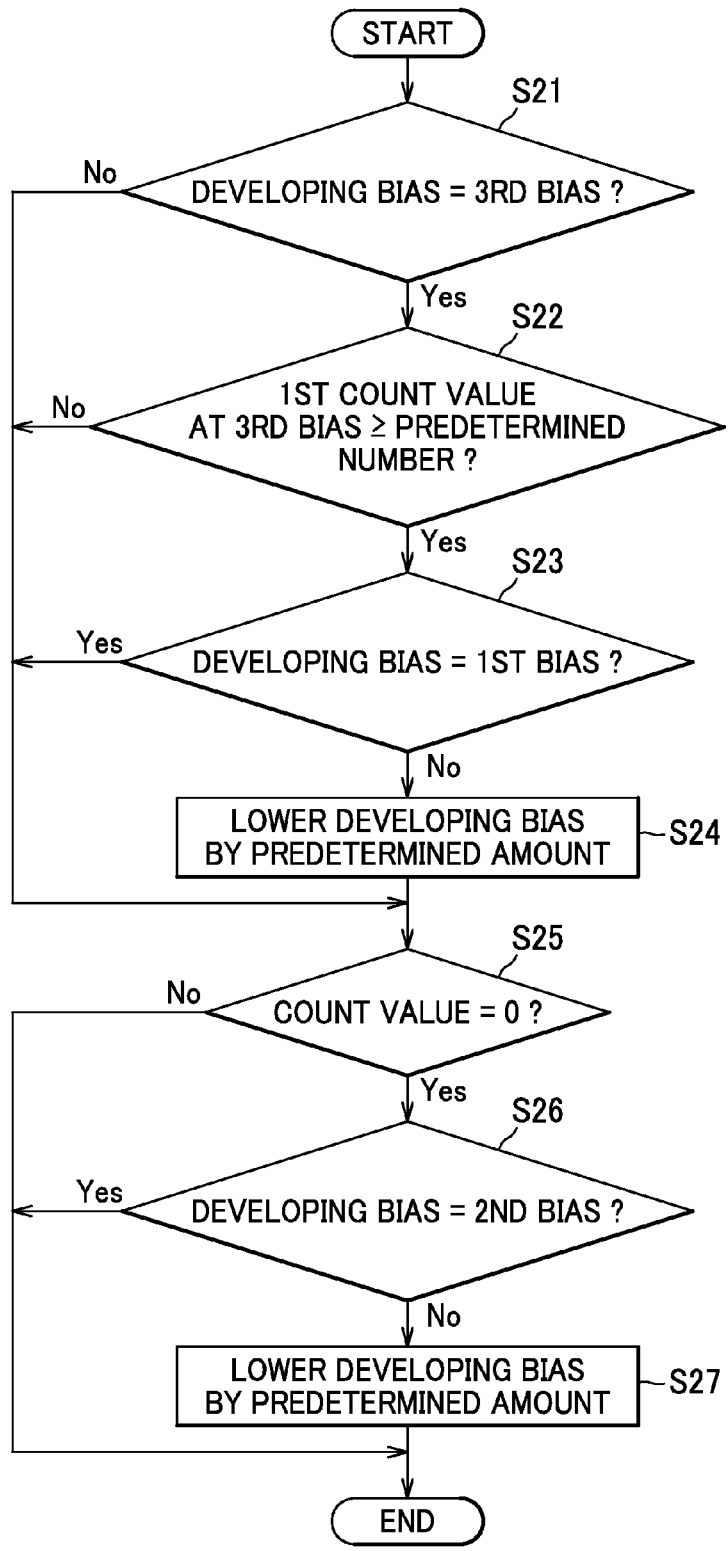
FIG. 6 is a flowchart explaining the operation of the controller in a developing bias control.

Returning to FIG. 5, after step S8 or if the controller 80 determines No in step S7, the operation proceeds to the developing bias control (S9) shown in FIG. 6. The developing bias control will be described later in detail.

After step S9, the controller 80 determines whether or not the print job has been completed (S10). If the controller 80 determines that the print job has not been completed (No), the operation returns to the process of step S6. If the controller 80 determines that the print job has been completed (Yes), the controller 80 completes this control.

In the developing bias control shown in FIG. 6, the controller 80 first determines whether or not the developing bias is the third bias (S21). If the controller 80 determines that the developing bias is the third bias (Yes) in step S21, then the controller 80 determines whether or not the first count value counted by the first counter that is different from the counter 87 is equal to or greater than the predetermined number (S22) with the developing bias being set to the third bias. In this disclosure, the first counter is configured to count up (increment) the first count value.

If the controller 80 determines that the first count value is equal to or greater than the predetermined number (Yes) in step S22, the controller 80 then determines whether or not the developing bias has been set to the first bias (S23). If the controller 80 determines that the developing bias has not been set to the first bias (No) in S23, then the controller 80 lowers the developing bias by a first predetermined amount from the current value (S24). It is to be noted that the first predetermined amount is an amount smaller than the difference between the third bias and the first bias.

Namely, if the controller 80 determines in step S22 that the first count value is equal to or greater than the predetermined number with the developing bias being set to the third bias, the controller 80 gradually decreases the developing bias from the third bias toward the first bias by decrements of the first predetermined amount in the processes of steps S23, S24. To be more specific, when the first count value reaches the predetermined number, the controller 80 sets the developing bias to a first intermediate bias that is smaller than the third bias by the first predetermined amount. Thereafter, when first count value takes a value that is obtained by adding "1" to the predetermined number, the controller 80 sets the developing bias to a second intermediate bias that is smaller than the first intermediate bias by the first predetermined amount. In other words, after the first count value reaches the predetermined number, the controller 80 lowers the developing bias by decrements of the first predetermined amount each time the number of printed sheets S is increased by "1."

After step S24 or if the controller 80 determines No in step S21 or step S22, or if the controller 80 determines Yes in step S23, then the controller 80 determines whether or not the count value of the counter 87 is "0" (S25). If the controller 80 determines that the count value is "0" (Yes) in step S25, then the controller 80 determines whether or not the developing bias has been set to the second bias (S26).

If the controller 80 determines that the developing bias has not been set to the second bias (No) in step S26, the controller 80 then lowers the developing bias by a second predetermined amount from the current value (S27). It is to be noted that the second predetermined amount is an amount smaller than the difference between the first bias and the second bias.

Namely, if the controller 80 determines in step S25 that the count value of the counter 87 has reached the threshold value of "0", the controller 80 gradually decreases the developing bias from the first bias toward the second bias by decrements of the second predetermined amount in the processes of steps S26, S27. After step S27 or if the controller 80 determines No in step S25, or if the controller 80 determines Yes in step S26, the controller 80 completes this control.

In the sleep mode shown in FIG. 7, the controller 80 first determines whether or not the power-off button 95 has been depressed (S31). If the controller 80 determines that the power-off button 95 has been depressed (Yes) in step S31, the controller 80 carries out a power-off process for turning off the power of the printer 10 and completes this control.

If the controller 80 determines that the power-off button 95 has not been not depressed (No) in step S31, the controller 80 determines whether or not 5 minutes has elapsed (S32) after completing the latest print job or after adding "5" to the count value of the counter 87 in step S34 to be described later. The measurement of 5 minutes (predetermined time) may be made with a timer.

If the controller 80 determines that 5 minutes has not been elapsed (No) in step S32, then the controller 80 determines whether or not a print job has been received (S33). If no print job has been received (No) in step S33, the operation returns to step S31.

On the contrary, if the controller 80 determines that 5 minutes has elapsed (Yes) in step S32, the controller 80 then adds "5" to the count value of the counter 87 (S34) and thereafter returns to the process in step S31. Namely, if the next print job is not outputted for 5 minutes in steps S31 to S34 after the latest print job is completed, the controller 80 then adds "5" to the count value. After that, if the next print job is not outputted for 5 minutes after increasing the count value to the former count value, the controller 80 adds "5" to the count value. Accordingly, after the latest print job is completed, the count value is increased by increments of "5" each time 5 minutes elapses. This can gradually increase the count value toward the initial value of "150."

If the controller 80 determines that a print job has been received (Yes) in step S33, the operation proceeds to the printing mode in FIG. 5 and the controller 80 completes this control.

Next, description will be given of an example of the developing bias control carried out by the controller 80.

Figure 9:
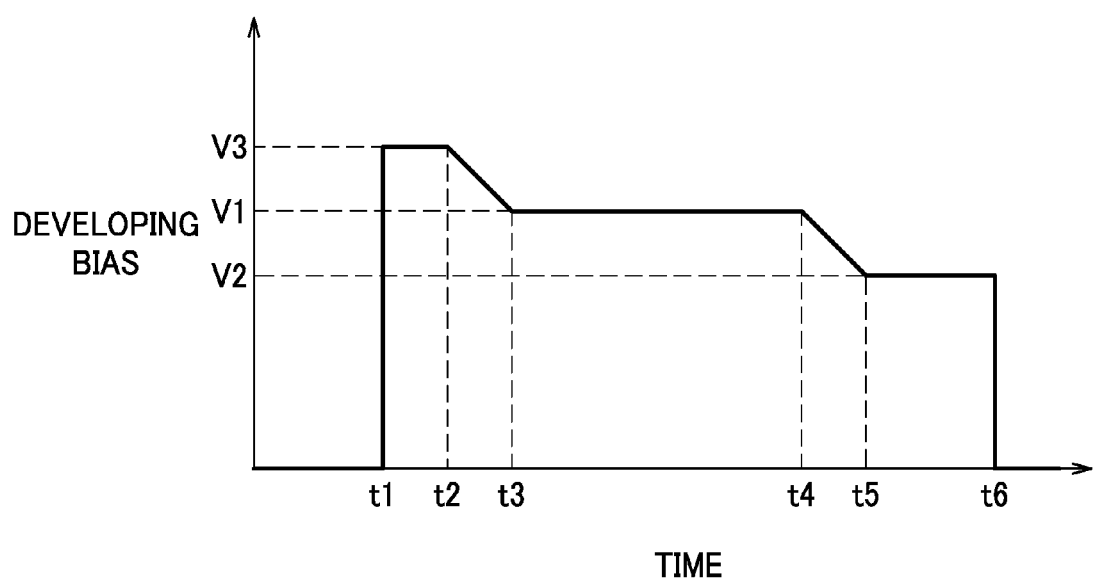
FIG. 9 is a graph explaining one example of the developing bias control made by the controller.

As seen in FIG. 9, if the controller 80 determines in step S2 (see FIG. 5) that the internal temperature is lower than the predetermined temperature, that is, the temperature in the main body casing of the printer 10 is low, then the controller 80 sets the developing bias to the third bias V3 (see time t1). After that, the controller 80 carries out the printing control with the developing bias being set to the third bias V3, and if the first count value counted by the first counter for counting the number of sheet S printed in this developing bias setting is equal to or greater than the predetermined number, the controller 80 then determines Yes in step S22 (see FIG. 6) and gradually lowers the developing bias from the third bias V3 toward the first bias V1 (see time t2 to time t3).

After that, when the count value of the counter 87 becomes "0", the controller 80 determines Yes in step S25 (see FIG. 6) and gradually lowers the developing bias from the first bias V1 toward the second bias V2 (see time t4 to time t5). Thereafter, when the controller 80 completes the printing control, the developing bias is set to "0" (see time t6).

According to the configuration as described above, the following advantageous effects can be achieved.

In the above disclosure, since the developing bias is decreased from the first bias to the second bias if the count value of the counter 87 (the counter 87 counting down the count value in accordance with the number of printed sheets S) has reached the threshold value of "0", that is, if the internal temperature has been elevated, it is possible to suppress degradation of the image quality by restraining the density of toner from being increased due to elevated internal temperature. It should be noted that in the case where the number of sheets S printed in the unit of time is equal to or greater than the reference number, the internal temperature does not increase so much because when a large number of sheets S (equal to or greater than the reference number) pass through the fixing device 50 in the unit of time, heat in fixing device 50 is removed by these sheets S. In the above-described configuration, since the controller 80 delays the execution timing of the bias changing process, it is possible to restrain the developing bias from being decreased when the internal temperature does not increase so much, so that the image quality can be improved.

In the above disclosure, since the developing bias is set to the third bias that is greater than the first bias if the internal temperature is lower than the predetermined temperature, it is possible to restrain the density of toner from being decreased when the temperature inside the printer 10 is cool, e.g., when the printer 10 is powered on first time in a day.

In the above disclosure, since the developing bias is gradually decreased from the third bias to the first bias in the changing process, an abrupt change in the developing bias can be prevented, for example, as compared to a control in which the developing bias is instantly changed from the third bias to the first bias. This can lead to an improvement in the image quality.

In the above disclosure, since the developing bias is gradually decreased from the first bias to the second bias in the bias changing process, an abrupt change in the developing bias can be prevented, for example, as compared to a control in which the developing bias is instantly changed from the first bias to the second bias. This can lead to an improvement in the image quality.

Although one illustrative example has been described in detail, the present invention is not limited to this specific configuration. It is to be understood that various changes and modifications, such as those described below, may be made without departing from the scope of the appended claims. In the following descriptions, parts similar to those previously described are denoted by the same reference numerals and detailed description thereof will be omitted.

Figure 10:
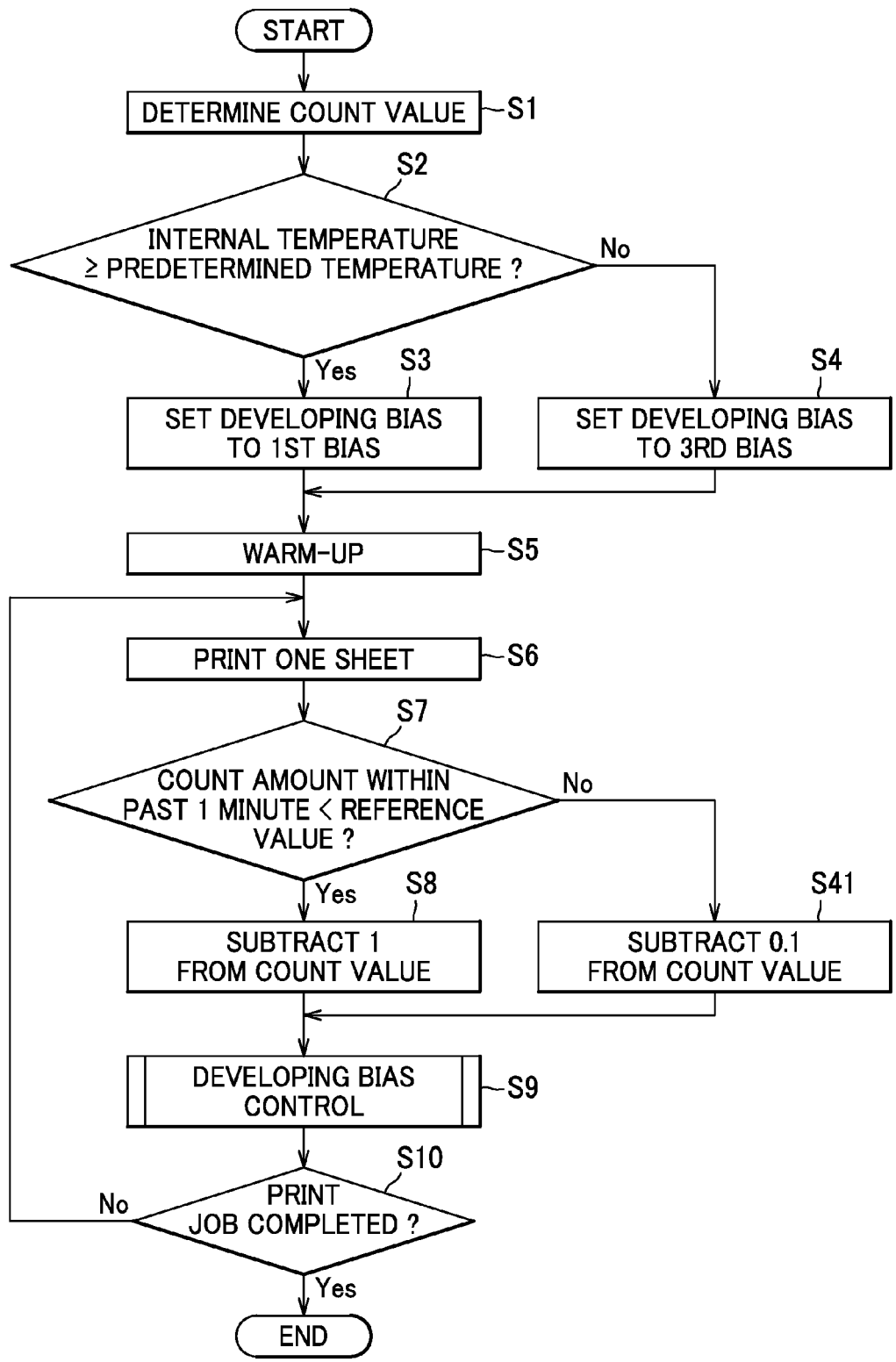
FIG. 10 is a flowchart explaining a first modification.

In the above disclosure, until the number of sheets S printed in the unit of time reaches the reference number, the counter 87 counts down the count value by "1" each time one sheet S is printed. After the number of printed sheets S has reached the reference number, the controller 80 prohibits the counter 87 from decreasing the count value any more. However, the present invention is not limited to this specific control as long as the manner of counting by the counter 87 can be performed such that the count amount per sheet S is set to be smaller if the number of sheets S printed in the unit of time is equal to or greater than the reference number, with respect to the count amount determined if the number of sheets printed in the unit of time is smaller than the reference number. Other than the control in the above disclosure in which the counting of the counter 87 is prohibited if the number of printed sheets S has reached the reference number so that the count amount per sheet S (i.e., average value of the count amount) is reduced, another control may be applied in which the count amount per se is changed; for example, the count amount per sheet is set to "1" if the number of sheets S printed in the unit of time is smaller than the reference number, and the count amount per sheet is set to "0.1" if the number of sheets S printed in the unit of time is equal to or greater than the reference number. To be more specific, for example, as shown in the flowchart of FIG. 10, a process for subtracting "0.1" from the count value (S41) may be added after the controller 80 determines No in step S7 in the above-described flowchart of FIG. 5.

In the above disclosure, if the count amount of the counter 87 within the past 1 minute is equal to or greater than the reference number of "10", the count value of the counter 87 is not decreased for the next 1 minute while the printer 10 prints the 11th to 20th sheets, so that the execution timing of the bias changing process is delayed. In other words, the execution timing of the bias changing process is delayed by changing the manner of counting based on the determination as to whether or not the number of sheets S printed in the unit of time is equal to or greater than the reference number. However, the present invention is not limited to this specific control as long as the execution timing of the bias changing process is delayed if the number of sheets S printed in the unit of time is equal to or greater than the reference number. For example, the execution timing of the bias changing process may be delayed by changing the threshold value of the counter 87. Namely, the threshold value of the counter 87 may be changed to take a value such that the execution timing of the bias changing process is delayed if the number of sheets S printed in the unit of time is equal to or greater than the reference number. For example, in the case where the counter 87 counts down (decrements) the count value in accordance with the printing process, the threshold value may be initially set to a numerical value of "X" and then changed to a numerical value smaller than "X" if the number of sheets S printed in the unit of time is equal to or greater than the reference number.

Figure 11:
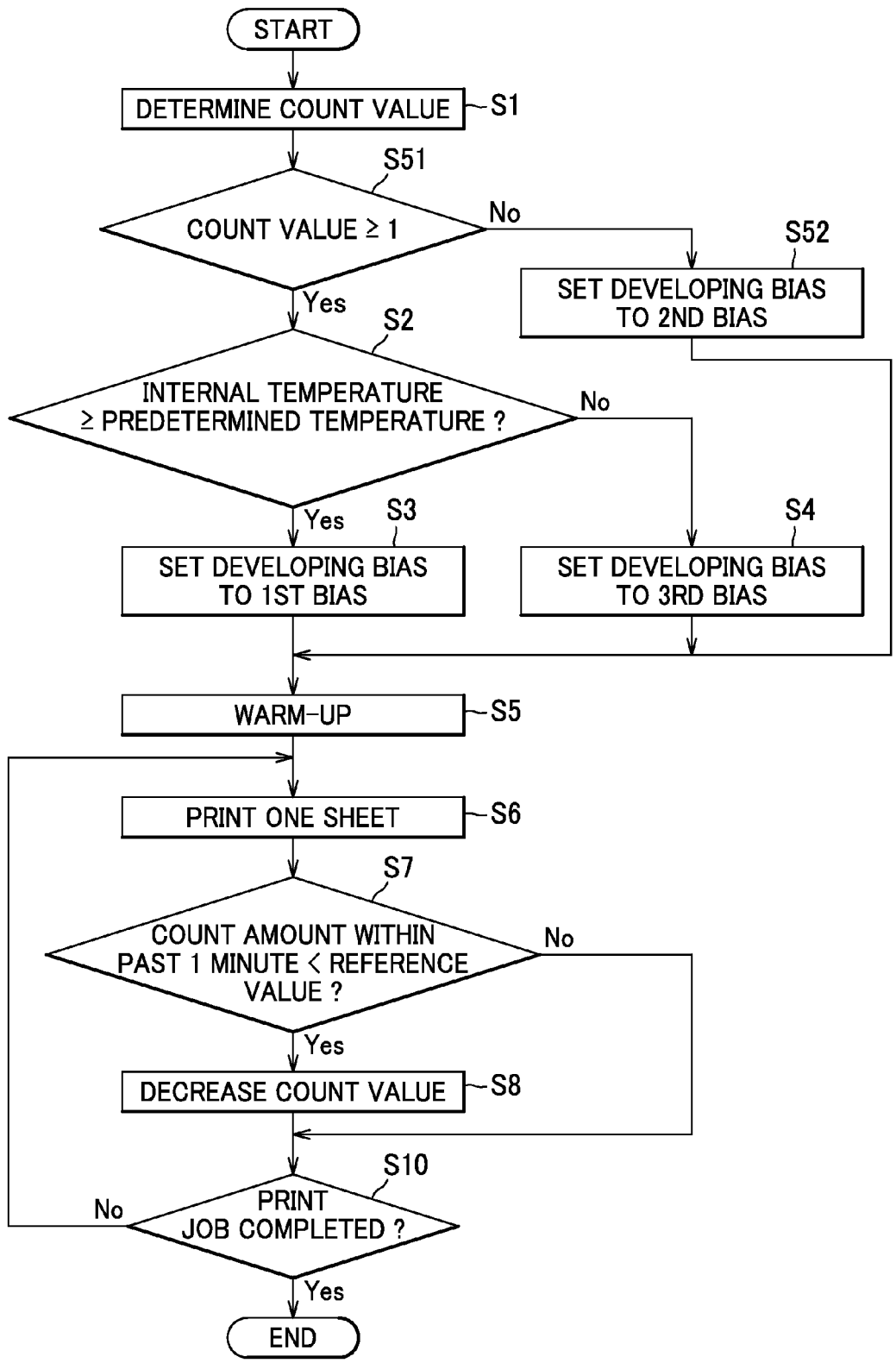
FIG. 11 is a flowchart explaining a second modification.

In the above disclosure, the changing process (step S21 to step S24) and the bias changing process (step S25 to step S27) are carried out while a print job is being executed (step S5 to step S10). However, the present invention is not limited to this specific control. For example, as shown in FIG. 11, the changing process (step S2 and step S3) may only be carried out while a print job is not being executed. Similarly, the bias changing process (step S51 and step S52) may only be carried out while a print job is not being executed.

To be more specific, according to this modification, after step S1, the controller 80 determines whether or not the count value of the counter 87 is equal to or greater than "1" (S51). If the controller 80 determines that the count value is smaller than "1", i.e., 0 (No) in step S51, then the controller 80 sets the developing bias to the second bias (S52). Namely, if the developing bias is set to the first bias in step S52, the controller 80 changes the developing bias from the first bias to the second bias.

As described above, the changing process and the bias changing process are carried out while a print job is not being executed. As a result, the developing bias is not changed while a print job is being executed. This can improve the image quality.

In the above disclosure, the counter 87 is configured to count the count value in a count-down manner (i.e., by subtracting "1" from the count value). However, the present invention is not limited to this configuration. For example, the counter 87 may be configured to count the count value in a count-up manner. In this modification, various threshold values may be set in accordance with the counting manner.

In the above disclosure, the controller 80 estimates whether or not the internal temperature is lower than the predetermined temperature, based on the temperature detected by the temperature sensor (fixing device thermistor 55) and the elapsed time after a print job is completed. However, the present invention is not limited to this specific control, and such estimation may be made based on the temperature detected by the temperature sensor only, or based on the elapsed time only.

In the above disclosure, the timing of the setting process for changing the developing bias to the third bias is set at a time after the controller 80 receives a printing command. However, the present invention is not limited to this specific control, and the setting process may be carried out before the controller 80 receives a printing command. Namely, in a configuration of the controller 80 in which the setting value of the developing bias is stored in the memory (NVRAM) and the setting value is changed in accordance with various conditions, the setting value of the developing bias may be set to the third bias before the controller 80 receives a printing command, for example, when a predetermined time has elapsed after the latest print job is completed.

In the above disclosure, the controller 80 decreases the developing bias from the third bias toward the first bias if the first count value of the first counter is equal to or greater than the predetermined number with the developing bias being set to the third bias. However, the present invention is not limited to this specific control. For example, the controller 80 may change the developing bias from the third bias to the first bias if the number of rotations of the developing roller is equal to or greater than a predetermined number with the developing bias being set to the third bias.

The above disclosure relates to the printer 10. However, the present invention is not limited to this printer, and may be applicable to other image forming apparatuses such as a copying machine or a multifunction peripheral.

Further, in the above disclosure, the controller 80 includes one CPU 81, the ROM 83, the NVRAM 85, and other components. However, the controller may include a plurality of CPUs 81. As an alternative, the controller may include a CPU 81 combined with a hardware circuit such as ASIC (Application-specific integrated circuit), or the controller may consist of a hardware circuit only.

Further, the present invention is applicable to both systems using positively charged toner and negatively charged toner.

What is claimed is:

1. An image forming apparatus comprising:
   an image forming unit configured to form an image on a sheet, the image forming unit including a photoconductor, and a developer carrier configured to carry developer to be supplied to an electrostatic latent image formed on the photoconductor; and a controller configured to control the image forming unit, wherein the controller includes process modules to carry out:
- a counting process for performing counting in accordance with the number of sheets printed by the image forming unit;
- a first bias applying process for setting a developing bias to be applied to the developer carrier to a first bias if a count value in the counting process has not reached a predetermined threshold value;
- a bias changing process for changing the developing bias to a second bias whose absolute value is smaller than that of the first bias if the count value has reached the threshold value; and
- a delaying process for causing an execution timing of the bias changing process to be delayed if the number of sheets printed in a unit of time is equal to or greater than a reference number, with respect to an execution timing determined if the number of sheets printed in the unit of time is smaller than the reference number.

2. The image forming apparatus according to claim 1, wherein the delaying process is carried out such that a count amount per sheet in the counting process is set to be smaller if the number of sheets printed in the unit of time is equal to or greater than the reference number, with respect to a count amount determined if the number of sheets printed in the unit of time is smaller than the reference number.

3. The image forming apparatus according to claim 2, wherein the delaying process is carried out such that if the number of sheets printed in the unit of time is equal to or greater than the reference number, an execution of the counting process is prohibited.

4. The image forming apparatus according to claim 1, wherein the controller is further configured to carry out:
- a setting process for setting the developing bias to a third bias whose absolute value is greater than that of the first bias if a temperature in the image forming apparatus is estimated to be smaller than a predetermined temperature; and
- a changing process for changing the developing bias from the third bias to the first bias if the temperature in the image forming apparatus is estimated to be equal to or greater than the predetermined temperature.

5. The image forming apparatus according to claim 4, wherein the controller is configured to estimate in the setting process the temperature in the image forming apparatus to be smaller than the predetermined temperature if a predetermined time has elapsed after a print job is completed.

6. The image forming apparatus according to claim 4, wherein the controller is configured to gradually decrease the developing bias in the changing process from the third bias to the first bias.

7. The image forming apparatus according to claim 4, wherein the controller is configured to carry out the changing process while a print job is not being executed.

8. The image forming apparatus according to claim 1, wherein the controller is configured to gradually decrease the developing bias in the bias changing process from the first bias to the second bias.

9. The image forming apparatus according to claim 1, wherein the controller is configured to carry out the bias changing process while a print job is not being executed.

10. An image forming apparatus comprising:
- an image forming unit configured to form an image on a sheet, the image forming unit including a photoconductor, and a developer carrier configured to carry developer to be supplied to an electrostatic latent image formed on the photoconductor; and
- a controller configured to control the image forming unit, wherein the controller comprises:
  - a counting process executing module configured to perform counting in accordance with the number of sheets printed by the image forming unit;
  - a first bias applying process executing module configured to set a developing bias to be applied to the developer carrier to a first bias if a count value counted by the counting process executing module has not reached a predetermined threshold value;
  - a bias changing process executing module configured to change the developing bias to a second bias whose absolute value is smaller than that of the first bias if the count value has reached the threshold value; and
  - a delaying process executing module configured to cause an execution timing for changing the developing bias to the second bias to be delayed if the number of sheets printed in a unit of time is equal to or greater than a reference number, with respect to an execution timing determined if the number of sheets printed in the unit of time is smaller than the reference number.

11. The image forming apparatus according to claim 10, wherein the delaying process executing module is further configured to set a count amount per sheet corresponding to the counting by the counting process executing module to be smaller if the number of sheets printed in the unit of time is equal to or greater than the reference number, with respect to a count amount determined if the number of sheets printed in the unit of time is smaller than the reference number.

12. The image forming apparatus according to claim 11, wherein the delaying process executing module is further configured to prohibit the counting process executing module from counting if the number of sheets printed in the unit of time is equal to or greater than the reference number.

13. The image forming apparatus according to claim 10, wherein the controller further comprises:
- a setting process executing module configured to set the developing bias to a third bias whose absolute value is greater than that of the first bias if a temperature in the image forming apparatus is estimated to be smaller than a predetermined temperature; and
- a changing process executing module configured to change the developing bias from the third bias to the first bias if the temperature in the image forming apparatus is estimated to be equal to or greater than the predetermined temperature.

14. The image forming apparatus according to claim 13, wherein the controller further comprises:
- an internal temperature estimating module configured to estimate the temperature in the image forming apparatus to be smaller than the predetermined temperature if a predetermined time has elapsed after a print job is completed.

15. The image forming apparatus according to claim 13, wherein the changing process executing module is further configured to gradually decrease the developing bias from the third bias to the first bias.

16. The image forming apparatus according to claim 13, wherein the changing process executing module is further configured to change the developing bias from the third bias to the first bias while a print job is not being executed.

17. The image forming apparatus according to claim 10, wherein the bias changing process executing module is further configured to gradually decrease the developing bias from the first bias to the second bias.

18. The image forming apparatus according to claim 10, wherein the bias changing process executing module is further configured to change the developing bias to the second bias while a print job is not being executed.

* * * * *